Figure 1:
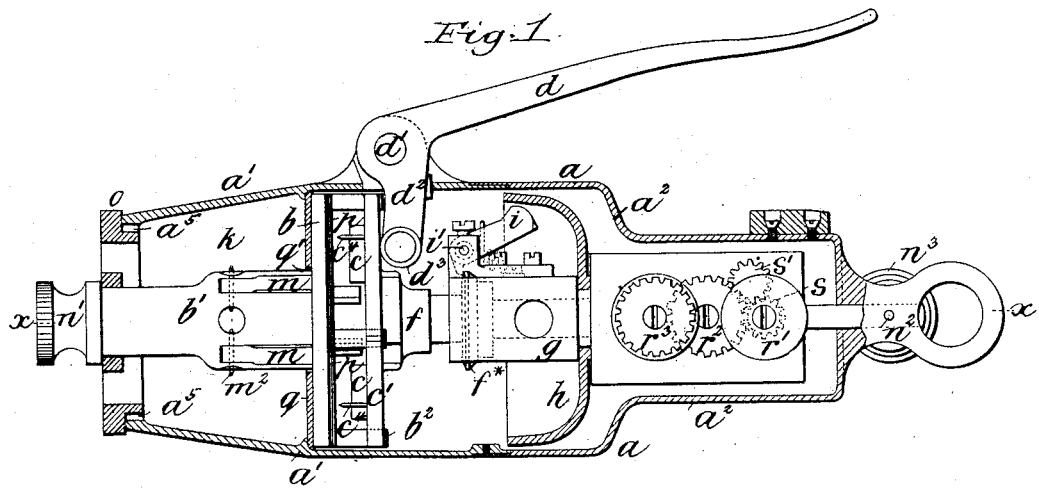

(No Model.) 4 Sheets—Sheet 1.

G. J. THORPE & J. H. RICHARDSON.
TICKET PUNCH AND REGISTER.

No. 343,090. Patented June 1, 1886.

Witnesses.
J. A. Rutherford
Robert Everett

Inventors.
George J. Thorpe
John H. Richardson
By James L. Norris
Atty.

N. PETERS. Photo-Lithographer, Washington, D. C.

(No Model.) 4 Sheets—Sheet 2.

G. J. THORPE & J. H. RICHARDSON.
TICKET PUNCH AND REGISTER.

No. 343,090. Patented June 1, 1886.

Witnesses.
J. A. Rutherford
Robert Everett

Inventors.
George J. Thorpe
John H. Richardson
By James L. Norris
Atty (No Model.) 4 Sheets—Sheet 3.

G. J. THORPE & J. H. RICHARDSON.
TICKET PUNCH AND REGISTER.

No. 343,090. Patented June 1, 1886.

Witnesses.
J. A. Rutherford
Robert Everett

Inventors.
George J. Thorpe
John H. Richardson
By James L. Norris.
Atty.

(No Model.) 4 Sheets—Sheet 4.

G. J. THORPE & J. H. RICHARDSON.
TICKET PUNCH AND REGISTER.

No. 343,090. Patented June 1, 1886.

Witnesses.
J. A. Rutherford
Robert Everett

Inventors.
George J. Thorpe
John H. Richardson
By James L. Norris.
Atty.

UNITED STATES PATENT OFFICE.

GEORGE JAMES THORPE AND JOHN HENRY RICHARDSON, OF MANCHESTER, ASSIGNORS TO GEORGE TAYLOR, OF LONDON, AND DANIEL BOYD, OF MANCHESTER, ENGLAND.

TICKET PUNCH AND REGISTER.

SPECIFICATION forming part of Letters Patent No. 343,090, dated June 1, 1886.

Application filed December 28, 1885. Serial No. 186,922. (No model.) Patented in England February 28, 1885, No. 2,698.

*To all whom it may concern:*

Be it known that we, GEORGE JAMES THORPE, manager, and JOHN HENRY RICHARDSON, engineer, subjects of the Queen of Great Britain, and both residents of Manchester, England, have invented new and useful Improvements in Ticket Punching and Registering Apparatus, chiefly designed for use in tramway-cars and omnibuses, (for which we have obtained a patent in Great Britain, No. 2,698, bearing date February 28, 1885,) of which the following is a specification, reference being had to the accompanying drawings.

Our invention relates to ticket punching and registering apparatus, and its main object is to provide for preventing fraud by conductors of tramway-cars and omnibuses, or by doorkeepers or other persons intrusted with the receipt of money at theaters, gardens, or similar places.

Ticket-punches, as heretofore constructed, are usually so made that they will punch round, square, or triangular holes in the tickets, or so that they will cut pieces out of the edges of the tickets, and it has been customary to print upon the tickets, figures or numeral characters indicating the price to be paid therefor.

An important feature of our invention is the construction of the apparatus in such a manner that it will punch holes through the tickets representing the figures or numeral characters which indicate the prices to be paid for such tickets. We thus obviate the necessity for printing figures upon the tickets, and provide for indicating more clearly than heretofore to the purchaser of a ticket the sum he should pay for the same. Moreover, we provide means whereby the pieces cut or punched out of the tickets can be retained within the apparatus, so that they can be subsequently counted to ascertain the total amount of money received by the conductor or other person.

Our apparatus is usually constructed with mechanism whereby it will register or record either the number of tickets punched or the aggregate value thereof in pounds, shillings, and pence, or in any other desired coinage.

Our said invention, moreover, comprises various improvements hereinafter set forth.

Figure 2:
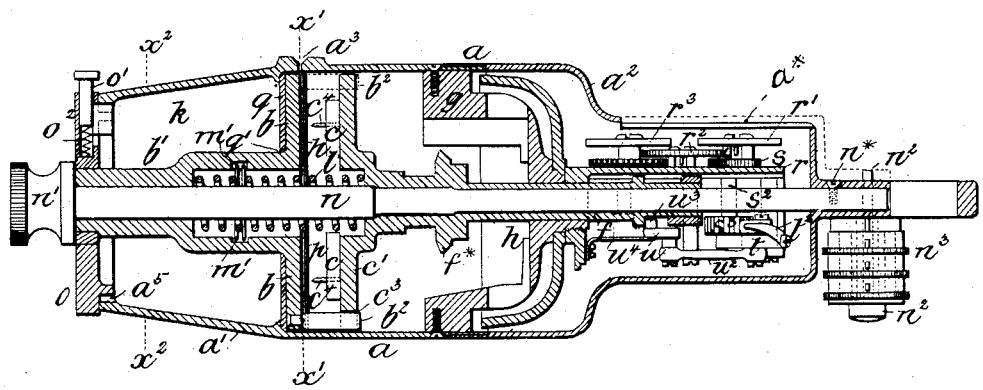
Figures 3, 4:
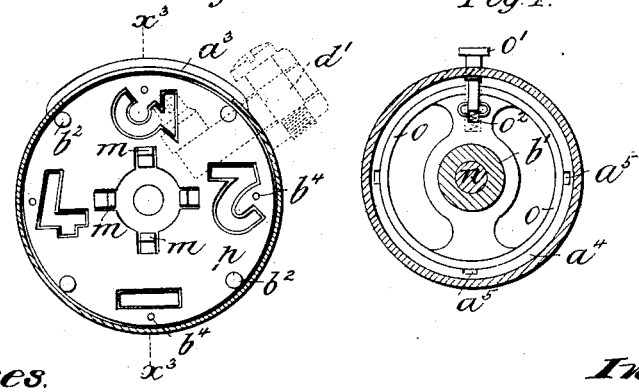
Figure 8:
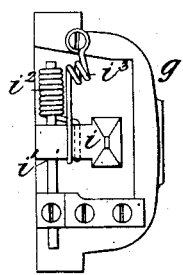
Figure 9:
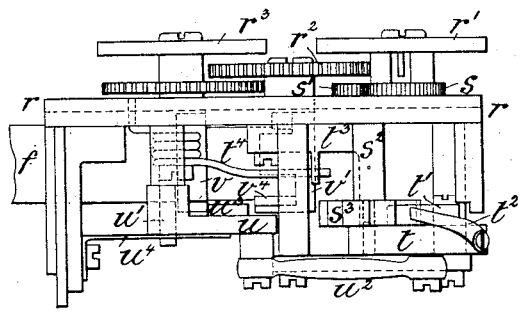
Figure 10:
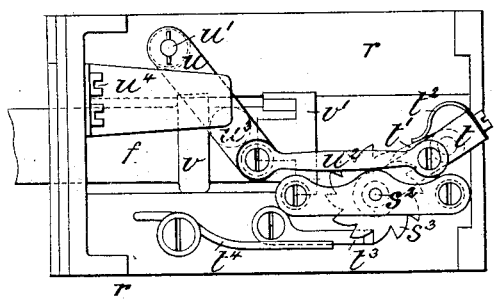
Figure 11:
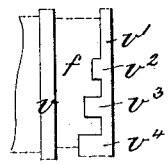
Figure 5:
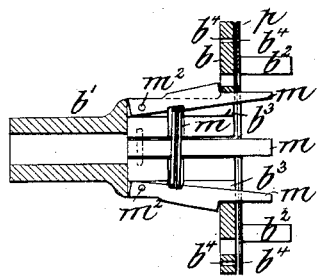
Figure 6:
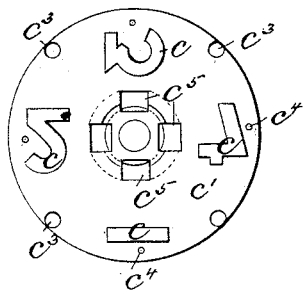
Figure 7:
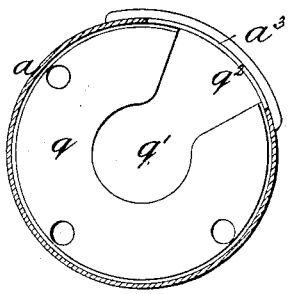
Figure 12:
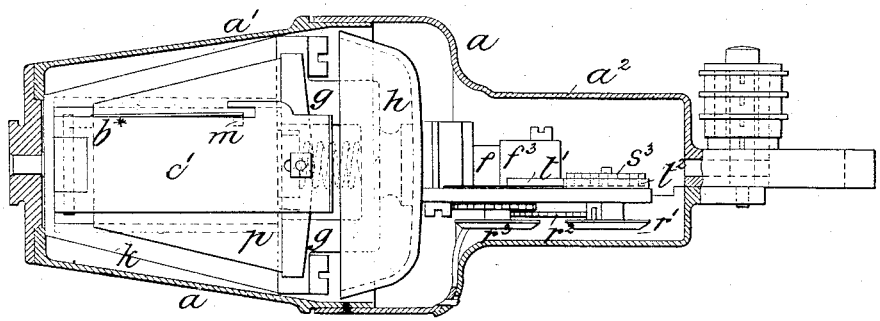
Figure 13:
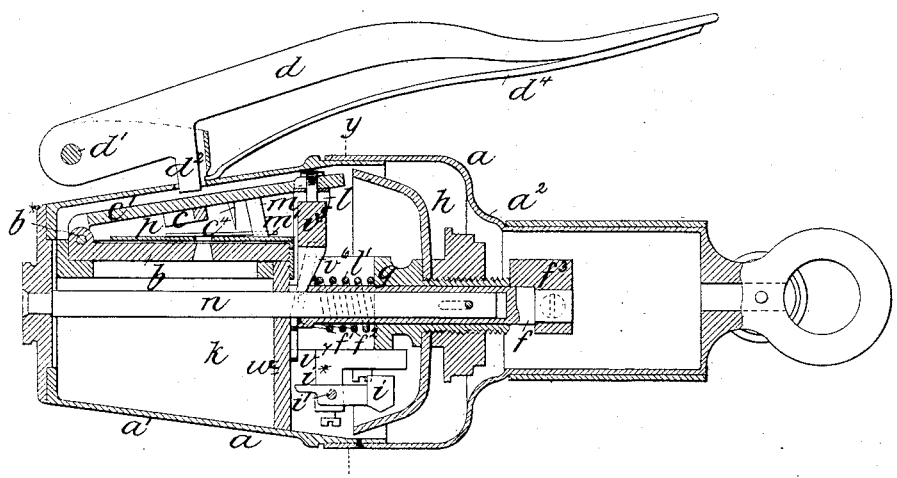
Figure 14:
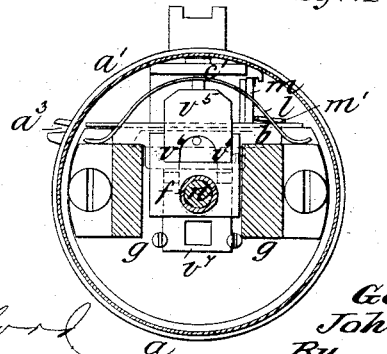
Figure 15:
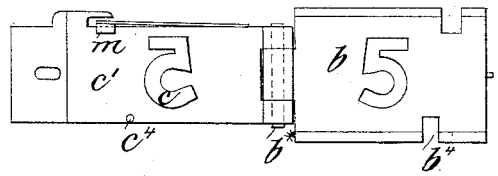
Figure 16:
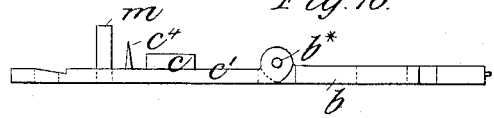
Figure 17:
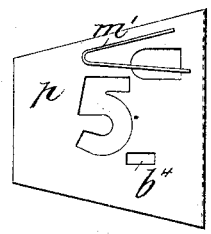
Figure 19:
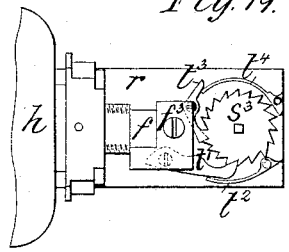
Figure 18:
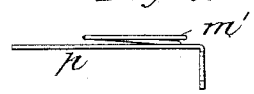
Figure 20:
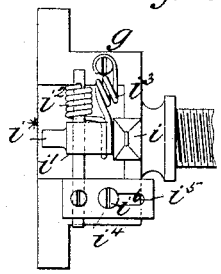
Figure 21:
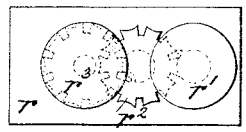

In the accompanying drawings, Figure 1 is a side elevation of our apparatus, partly in vertical central section. Fig. 2 is a horizontal section on the line $x\,x$, Fig. 1. Fig. 3 is a transverse section on the line $x'\,x'$, Fig. 2. Fig. 4 is a transverse section on the line $x^2\,x^2$, Fig. 2. Fig. 5 is a section on the line $x^3\,x^3$, Fig. 3. Fig. 6 is a face view of a disk or plate carrying the punches. Figs. 7 and 8 show details of construction. Fig. 9 is an inverted plan, and Fig. 10 is a side elevation, both drawn to an enlarged scale, showing the registering mechanism. Fig. 11 is a diagram illustrating a device hereinafter described for actuating the registering mechanism. Fig. 12 is a plan, partly in horizontal central section, and Fig. 13 is a vertical longitudinal central section, of a modified form of the apparatus. Fig. 14 is a transverse section on the line $y\,y$, Fig. 13. Fig. 15 is a face view, and Fig. 16 an edge view, of the punch and die-plates. Figs. 17 to 21 show various details of construction.

Like letters indicate corresponding parts throughout the drawings.

$a$ is the case of the apparatus, which may be of any convenient form, and which is preferably made in two parts, $a'\,a^2$, as shown.

$a^3$ is an aperture or slit formed in the case $a$, to permit the insertion of the tickets to be punched.

$b$ is the die-plate.

$c\,c$ are the punches.

$d$ is a lever, which is pivoted at $d'$ to lugs formed on or attached to the case $a$, and which has an arm, $d^2$, extending through a hole in the said case, and arranged to act upon the punch or punches therein.

$f$ is a hollow shaft connecting the punching mechanism with the registering mechanism, as hereinafter described.

$g$ is a frame fixed within the case $a$ and carrying a bell, $h$, and a hammer, $i$, which is pivoted at $i'$.

$i^2$ is a spring, which is slightly unwound when the hammer is moved back, as hereinafter described, and which then reacts to cause the said hammer to strike the bell.

$i^3$ is a spring for holding the hammer out of contact with the bell when not in action.

$k$ is a chamber or space for receiving the pieces punched out of the tickets, which pieces can, if desired, be collected in the said chamber, and subsequently counted for the purpose above specified.

$l$ is a spring for moving the punches away from the dies after a ticket has been punched.

$m\, m$ are figures which are arranged in combination with a spring, $m'$, and which act, as hereinafter described, to prevent the operation of the apparatus until a ticket is inserted therein in position to be punched.

In the apparatus shown in Figs. 1 to 11, the die-plate $b$ is fixed or formed on a sleeve, $b'$, which is fitted to rotate upon a central rod, $n$. The punches $c$ are firmly attached to a disk or plate, $c'$, fixed or formed on the hollow shaft $f$, which is also fitted to rotate upon the central rod, $n$. The die-plate $b$ is provided with pins or projections $b^2$, which are fitted to slide in holes or notches $c^3$ in the plate $c'$, to insure the coincidence of the dies and punches, and the rotation of the plate $c'$ with the die-plate $b$. The said plates are arranged to be rotated (to bring the desired punch and die into position to punch the ticket) by means of a milled wheel, $o$, which is keyed on the sleeve $b'$, and is fitted with a capability of rotation in the end of the case $a$. The said case is provided with an internal flange, $a^4$, Fig. 4, having notches $a^5$, and the wheel $o$ is provided with a bolt, $o'$, which is acted upon by a spring, $o^2$, so that it will enter one of the said notches $a^5$ when the corresponding punch and die are in position to operate upon a ticket. The said wheel $o$ is held in the case $a$ by a knob or handle, $n'$, on the rod $n$, which rod is passed through the said case and secured therein by a pin or bolt, $n^2$, and also by a screw, $n^*$. The said pin or bolt is preferably held in place by means of a lock, $n^3$. The arm $d^2$ of the lever $d$ is provided with an anti-friction roller, $d^3$, which bears against the plate $c'$, so that when the lever $d$ is depressed the plate $c'$ is moved toward the die-plate and the punches $c$ are forced through the corresponding holes in the said die-plate. A spiral spring, $l$, is placed upon the central rod, $n$, between the die-plate $b$ and the plate $c'$, to effect the return movement of the plate $c'$ when the pressure on the lever $d$ is relaxed. A guide-plate, $p$, is attached to the die-plate $b$ in such a manner that a space is left between the said plates, and when a ticket is inserted into the slit $a^3$ it will enter the said space. This guide-plate, moreover, acts very advantageously to hold the ticket, and thus facilitate the withdrawal of the punch therefrom in its return movement. The fingers $m$ are arranged within slots $b^3$ in the sleeve $b'$, and are pivoted at $m^2$, and acted upon by a circular spring, $m'$, which tends to hold them in the position shown in Fig. 5. A plate, $q$, is fixed in the case $a$, and serves as a bearing for the die-plate $b$. This plate $q$ is made with a central hole, $q'$, and with an aperture, $q^2$, communicating therewith. When the die-plate $b$ and sleeve $b'$ are in their proper position in the case $a$, the said sleeve fits into the hole $q'$, and when the apparatus is adjusted to operate upon a ticket the inner edge of the plate $q$ holds three of the fingers $m$ in position to enter notches $c^5$, formed for the purpose in the plate $c'$, but the other finger $m$, which is opposite the aperture $q^2$, and is therefore not acted upon by the edge of the plate $q$, will abut against the plate $c'$ and prevent the movement thereof, and consequently the operation of the apparatus. When, however, a ticket is pushed into the slit $a^3$, the said finger will thereby be moved into position to enter the corresponding notch, $c^5$, in the plate $c'$, and the apparatus can then be operated to punch the said ticket. We thus provide for permitting the operation of the apparatus when, but not until, a ticket is inserted. The pieces cut or punched from the tickets will pass through the aperture $q^2$ into the chamber $k$, but will be prevented by the plate $q$ from passing from this chamber through the other holes of the die-plate, and thus obstructing the operation of the apparatus. The plate $c'$ is provided with pins or pointed projections $c^4$, which, when the apparatus is operated, enter holes $b^4$ in the plates $p$ and $b$. When the apparatus is operated to punch a ticket, one of these pins passes through the said ticket and holds the same in position while it is being punched, and until the parts have returned to their original positions. By these means we provide for insuring the registration, as hereinafter described, of each ticket punched or of the price to be paid therefor, before the said ticket can be withdrawn.

The registering mechanism is constructed and arranged as hereinafter set forth—that is to say, $r$ is a bracket, which is firmly secured to the frame $g$, and which carries the said mechanism. This mechanism comprises three wheels, $r'\, r^2\, r^3$, geared in any suitable manner, so that the wheel $r'$ in making one revolution will turn the wheel $r^2$ one-twentieth part of a revolution, and the wheel $r^2$ in making one revolution will turn the wheel $r^3$ one-twentieth or other part of a revolution, according to the total amount which the apparatus is to be capable of registering. The wheel $r'$ is provided with a dial having twelve divisions, the wheel $r^2$ with a dial having twenty divisions, and the wheel $r^3$ with a dial having twenty or any other suitable number of divisions, according to the amount which the apparatus is to be capable of registering. We term the wheel $r'$ the "pence-wheel," the wheel $r^2$ the "shillings-wheel," and the wheel $r^3$ the "pounds-wheel." A pinion, $s$, is fixed upon the arbor of the pence-wheel, and gears with a similar pinion, $s'$, fixed on an arbor, $s^2$, on which is also fixed a ratchet-wheel, $s^3$, having twelve teeth. A lever, $t$, is pivoted upon the arbor $s^2$, and carries a pawl, $t'$, and a spring, $t^2$, which tends to hold the said pawl in engagement with the ratchet-wheel $s^3$. A retaining-pawl, $t^3$, is pivoted to the bracket $r$, and is held in engagement with the ratchet-wheel $s^3$ by a spring, $t^4$. A lever, $u$, is pivoted at $u'$ to the bracket $r$, and is coupled by means of a link, $u^2$, to the lever $t$. The lever $u$ is provided with a pin or stud, $u^3$, which projects between two collars, $v\ v'$, fixed or formed on the hollow shaft $f$, which shaft extends through apertures in the frame $g$ and bracket $r$. A spring, $u^4$, is secured to the bracket $r$, so that it will press against the lever $u$, and thus prevent too much freedom in the working of the registering mechanism. The collar $v$ on the hollow shaft $f$ is a plain ring or annular piece; but the collar $v'$ is made with a series of projections, $v^2\ v^3\ v^4$, differing in length, as shown in Fig. 11. Under normal conditions the collar $v$ bears against the pin or stud $u^3$ of the lever $u$, and holds the lever $t$ and pawl $t'$ in position, as shown, to act upon the ratchet-wheel $s^3$. When the lever $d$ is depressed, the collar $v'$, or one of its projections $v^2\ v^3\ v^4$, acts upon the pin or stud $u^3$, and thereby partially rotates the ratchet-wheel $s^3$. If the apparatus is so adjusted that the collar $v'$ will act upon the said pin or stud, the ratchet-wheel $s^3$ will be rotated through a distance equal to the length of one tooth of the said wheel. If, however, the apparatus is so adjusted that one of the projections $v^2$, $v^3$, or $v^4$ will act upon the said pin or stud, the said ratchet-wheel will be rotated through a distance equal to the length of two, three, or four teeth of the said wheel, according to the length of the said projection. The projections $v^2\ v^3\ v^4$ on the collar $v'$ are so arranged that when either of the punches 2, 3, or 4 is in position to operate upon a ticket, the corresponding projection, $v^2$, $v^3$, or $v^4$, will be in position to act upon the pin or stud $u^3$, and when the punch 1 is in position to operate upon a ticket neither of the said projections will be in position to act upon the said pin or stud. The plate $c'$ and the hollow shaft $f$ must, as above stated, be permitted to return to their original positions before a ticket that has been punched can be withdrawn. It is, therefore, evident that the ratchet-wheel must be rotated sufficiently to register the price to be paid for each ticket before the said ticket can be withdrawn from the apparatus. When the lever $d$ is depressed, the hammer $i$ is drawn back by the collar $f^*$ or the shaft $f$, and is then caused by the spring $i^2$ to strike the bell, as above described.

The apparatus shown in Figs. 12 to 21 is adapted for use when the tickets to be punched are to be all of one price—as, for instance, in the case of a tramway on which a certain fare is charged for the whole or any part of a journey. In this apparatus only one punch and a corresponding die are employed, and the plate $c'$ is hinged or pivoted at $b^*$ to the die-plate $b$. These plates and the slit $a^3$ are, moreover, parallel or nearly parallel with the central rod, $n$, instead of being at right angles thereto, as in the apparatus shown in Figs. 1 to 11. The lever $d$ is so arranged that its arm $d^2$ will act directly upon the plate $c'$ at the back of the punch $c$. The said lever is, moreover, provided with a spring, $d^4$, for effecting its return movement. A block, $v^5$, having an inclined surface, $v^6$, is secured to the plate $c'$, and is arranged to operate in combination with the hollow shaft $f$, (which is formed with a correspondingly-inclined surface, $f'$,) to actuate the registering mechanism when a ticket is punched. A curved spring, $l$, formed from a flat piece of steel, is attached to the back of the plate $c'$, and bears at its extremities against the frame $g$. This spring effects the return movement of the plate $c'$ and the block $v^5$ attached thereto. A spring, $l'$, is, moreover, placed upon the hollow shaft $f$, and bears at one end against the frame $g$ and at the other end against a shoulder, $f^2$, on the said shaft. This spring effects the return movement of the shaft $f$ after it has been moved to actuate the registering mechanism. The block $v^5$ is formed with an extension, $v^7$, to act upon an extension, $i^3$, of the hammer $i$, when a ticket is punched, and thus draw back the said hammer and then release it, so that it will strike the bell $h$. The bracket $i^4$, which carries the pivot-pin of the hammer $i$, is formed with a slot, $i^5$, through which is passed the screw that secures the said bracket to the frame $g$. By these means we provide for the adjustment of the hammer $i$ relatively to the extension $v^7$ of the block $v^5$. A plate, $w$, is fixed in the case $a$, to afford the requisite resistance to the block $v^5$ when in operation. The registering mechanism is greatly simplified, as it is only necessary that the ratchet-wheel should be rotated through a distance equal to the length of one tooth each time a ticket is punched. The said mechanism comprises three wheels, $r'\ r^2\ r^3$, geared in any suitable manner, according to the coinage for which they are designed. It also comprises a ratchet-wheel, $s^3$, which is fixed upon the arbor of the wheel $r'$, and a pawl, $t'$, which is pivoted to a block, $f^3$, fixed on the end of the shaft $f$, and is held in engagement with the ratchet-wheel $s^3$ by a spring, $t^2$, attached to the bracket $r$. Reciprocating motion is imparted to the shaft $f$ by the block $v^5$ in such a manner that, when a ticket is punched, the pawl $t'$ will act upon one of the teeth of the ratchet-wheel and partially rotate the said wheel, and will then be drawn back and engage with the next succeeding tooth of the said wheel. A retaining-pawl, $t^3$, is pivoted to the bracket $r$, and is held in engagement with the ratchet-wheel by the spring $t^4$, secured to the said bracket. An opening or openings, as at $a^5$ in Fig. 2, may be made in the case $a$, so that the dials of the registering mechanism will be at all times visible, and the said case may be provided with a sliding cover, as shown by dotted lines in the said figure, which cover will be fastened in place by the lock $n^3$ and key or bolt $n^2$, above described, so that the said dials may be entirely concealed from view, except when the case is unlocked and opened by some authorized person.

It is obvious that the construction of our apparatus may be somewhat modified without departing from the nature of our said invention. For instance, two or more punches and dies may be employed, and each punch arranged to be operated by a separate lever.

What we claim is—

1. In a ticket-punching apparatus, the combination of a case having a slit for the reception of a ticket, a series of punches bearing characters of different numerical values arranged on one side of said slit, a series of dies bearing corresponding characters arranged on the opposite side of said slit, and a lever for bringing the desired punch and die into operative position on opposite sides of said slit, substantially as described.

2. In a ticket-punching apparatus, the combination, with a case having a slit for the reception of a ticket and a die and a punch on opposite sides of said slit, of a plate interposed between said die and punch at one side of said slit to guide the ticket and hold the same during the withdrawal of the punch, substantially as described.

3. In a ticket-punching apparatus, the combination of the case formed with a slit for the reception of a ticket, a shaft passing through the case, a die and a punch supported by said shaft on opposite sides of said slit and each bearing corresponding numerical characters, a lever for moving the punch toward the die, and a register connected with the movable punch to be operated therefrom, substantially as described.

4. In a ticket-punching apparatus, the combination, with the case $a$, shaft $n$, and punch and die plates carried by said shaft, of a register within said case, a hollow sleeve, $f$, extending from the punch-plate and provided with collar $v$, and a collar, $v'$, having projections $v^2$ $v^3$ $v^4$, lever $u$, provided with stud $u^3$, fitting between collars $v$ $v'$, link $u^2$, and a pawl connecting the register with said link, all substantially as and for the purpose set forth.

5. In a ticket-punching apparatus, the combination, with the case having a slit, $a^3$, of the shaft $n$, the die-plate $b$, rotatable upon said shaft, the punch-plate $c'$, rotatable upon said shaft and movable thereon to and from the die-plate, and a spring interposed between said plates to act on the punch-plate, substantially as and for the purposes set forth.

6. In a ticket-punching apparatus, the combination, with case $a$, having slit $a^3$, of a shaft, $n$, carrying punch-plate $c$ and die-plate $b$, having sleeve $b'$, of the milled head $o$ and spring-actuated bolt $o'$, substantially as and for the purposes described.

7. In a ticket-punching apparatus, the combination, with case $a$, formed with slit $a^3$, of a shaft, $n$, of the punch-plate $c'$, mounted on said shaft and formed with notches $c^5$, the die-plate $b$ and its sleeve $b'$, mounted on said shaft, the plate $q$, encircling sleeve $b'$, and formed with aperture $q^2$, and fingers $m$, hinged to sleeve $b'$, and adapted to engage with the notches $c^5$, and one of them to fit in the aperture $q^2$, substantially as and for the purpose set forth.

8. In a ticket-punching apparatus, the combination, with a case, $a$, formed with slit $a^3$, of a shaft, $n$, a sliding and rotatable die-plate mounted on said shaft and formed with notches $c^3$, and a rotatable die-plate, $b$, mounted on the same shaft and provided with projections $b^2$, fitting in the notches $c^3$, substantially as and for the purposes set forth.

9. In a ticket-punching apparatus, the combination, with a case, $a$, formed with a slit, $a^3$, of a shaft carrying a punch-plate, $c'$, formed with projections $c^4$, and a plate, $p$, and die-plate $b$, mounted on said shaft, and each formed with holes $b^4$, to receive projections $c^4$, substantially as and for the purposes set forth.

10. The combination, with the case $a$, provided with the slit or aperture $a^3$, of the die-plate $b$, the punches $c$, carried by the plate $c'$, the lever $d$, the shaft $f$, having collars $v$ $v'$, and projections $v^2$ $v^3$ $v^4$, the spring $l$, the rod $n$, the milled wheel $o$, the lever $u$, the connecting-rod $u^2$, the lever $t$, carrying the pawl $t'$, the ratchet-wheel $s^3$, and the registering mechanism, all substantially as and for the purposes set forth.

11. The combination, with the case $a$, provided with the slit or aperture $a^3$, of the die-plate $b$, the punch $c$, carried by the plate $c'$, the lever $d$, the shaft $f$, the springs $l$ $l'$, the sliding piece $v^5$, the pawl $t'$, the ratchet-wheel $s^3$, and the registering mechanism, all substantially as and for the purposes set forth.

In testimony whereof we have hereunto signed our names in the presence of two subscribing witnesses.

GEORGE JAS. THORPE.
JOHN HENRY RICHARDSON.

Witnesses:
E. E. HAMPSON,
R. W. VINING.